Figure 1:
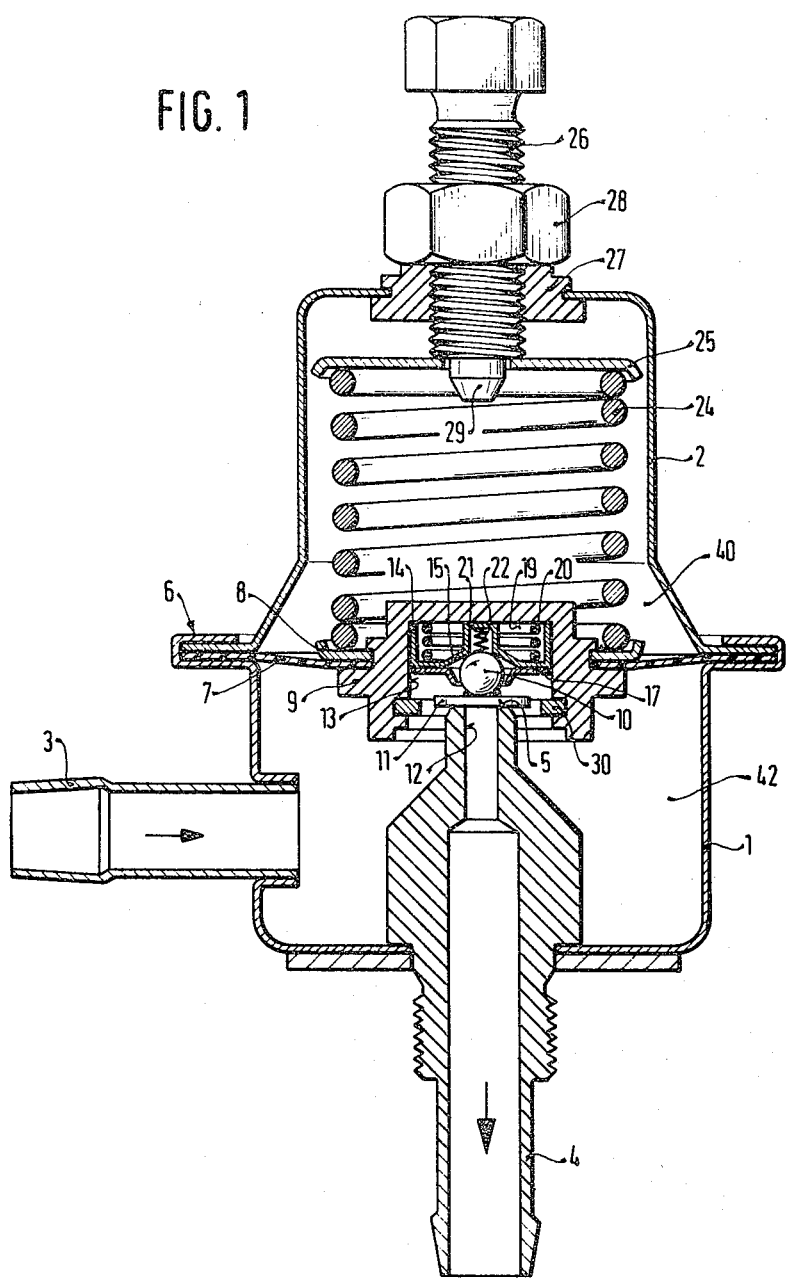
Figure 2:
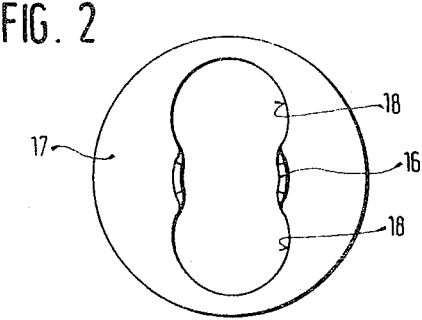
Figure 3:
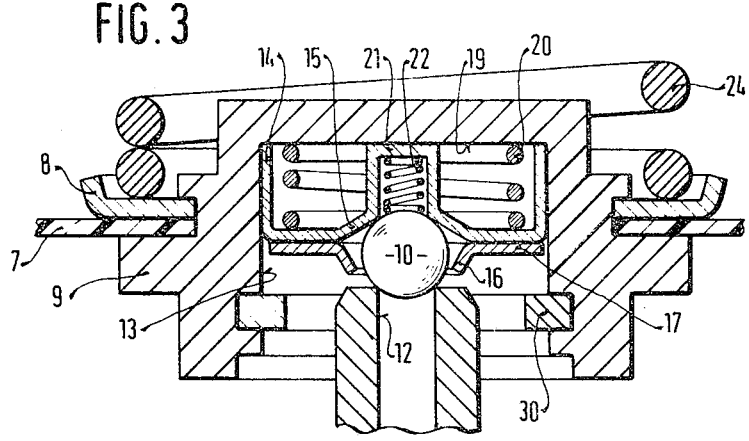
Figure 4:
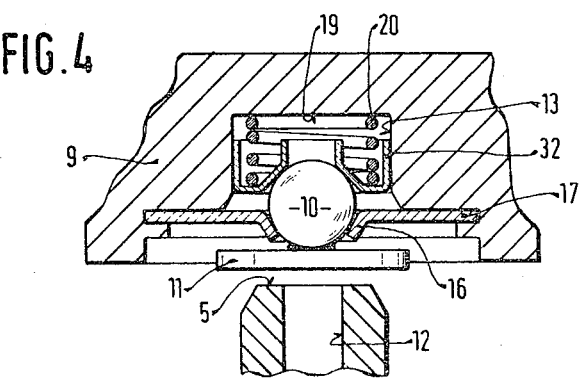
Figure 5:
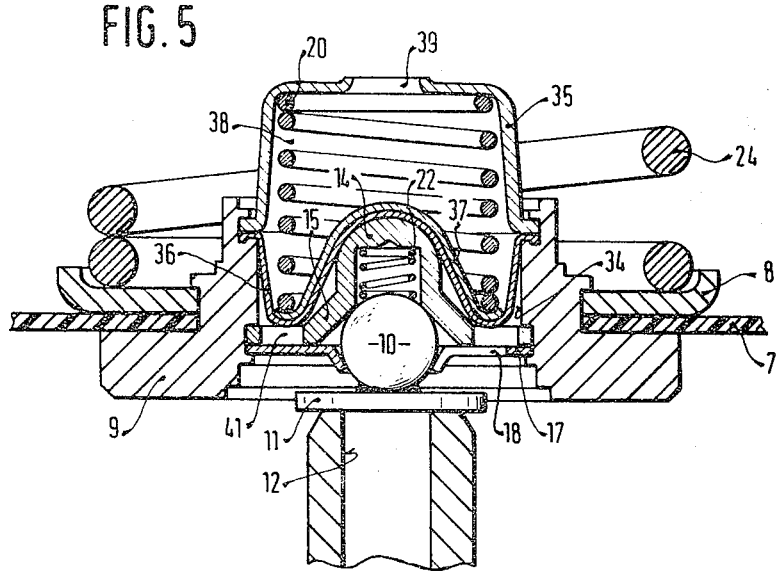
Figure 6:
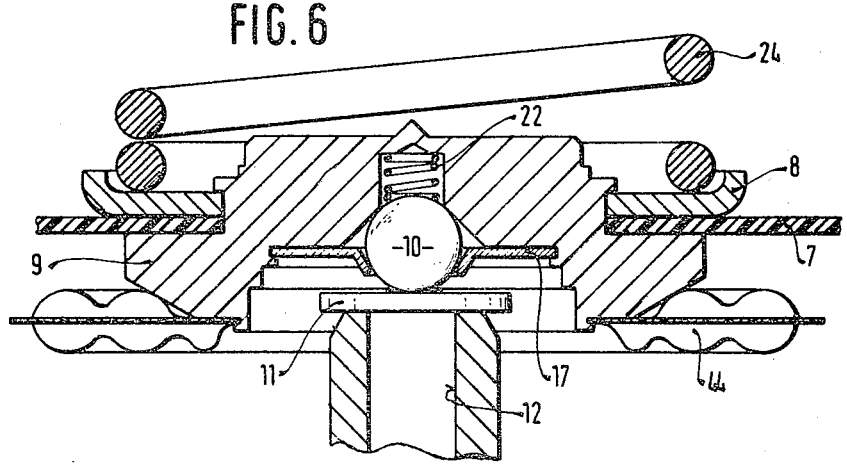

United States Patent [19]

Fehrenbach et al.

[11] 4,431,026
[45] Feb. 14, 1984

[54] PRESSURE CONTROL VALVE

[75] Inventors: Siegfried Fehrenbach, Markgröningen; Eberhard Utz, Stuttgart; Kurt Herbst, Burgstetten, all of Fed. Rep. of Germany

[73] Assignee: Robert Bosch GmbH, Stuttgart, Fed. Rep. of Germany

[21] Appl. No.: 318,769

[22] Filed: Nov. 6, 1981

Related U.S. Application Data

[62] Division of Ser. No. 124,047, Feb. 25, 1980, Pat. No. 4,327,767.

[30] Foreign Application Priority Data

Mar. 30, 1979 [DE] Fed. Rep. of Germany ....... 2912799

[51] Int. Cl.³ .............................................. F16K 31/12
[52] U.S. Cl. .................................... 137/510; 137/207; 137/568; 137/593
[58] Field of Search ................ 137/593, 568, 207, 510

[56] References Cited

U.S. PATENT DOCUMENTS

| | | | |
|---|---|---|---|
| 1,169,250 | 1/1916 | Fulton | 137/207 |
| 2,540,395 | 2/1951 | Ifield | 137/568 X |
| 3,333,597 | 8/1967 | Sullivan | 137/207 X |
| 3,511,270 | 5/1970 | Fehreubach | 251/86 X |
| 3,867,963 | 2/1975 | Ballard | 137/568 X |

FOREIGN PATENT DOCUMENTS 179340  5/1962  Sweden ............................... 137/510

Primary Examiner—Harold W. Weakley
Attorney, Agent, or Firm—Edwin E. Greigg

[57] ABSTRACT

A pressure control valve to control the pressure of a fluid in a fluid system so that it remains constant. This type of valve can be utilized as element of a fuel injection system for internal combustion engines, and has storage means which are independent of the valve member, and actuatable by the pressure of the fluid. The pressure control valve comprises a housing and a support assembly urged toward a valve seat by a control spring. Additionally, a storage spring in the support assembly urges a closing member toward the valve seat. The closing member is slidably received in a bore in the support assembly. The support assembly is connected to a membrane which is tensioned between the housing members. Other variations of this device are also revealed herein.

1 Claim, 6 Drawing Figures